(12) United States Patent
Krämer et al.

(10) Patent No.: US 11,143,340 B2
(45) Date of Patent: Oct. 12, 2021

(54) CLAWED SECURING MEANS

(71) Applicant: NORMA Germany GmbH, Maintal (DE)

(72) Inventors: Markus Krämer, Mainhausen (DE); Miroslav Lecbych, Dolni Dunajovice (CZ)

(73) Assignee: Norma Germany GmbH, Maintal (DE)

( * ) Notice: Subject to any disclaimer, the term of this patent is extended or adjusted under 35 U.S.C. 154(b) by 227 days.

(21) Appl. No.: 16/327,563

(22) PCT Filed: Aug. 18, 2017

(86) PCT No.: PCT/EP2017/070974
§ 371 (c)(1),
(2) Date: Feb. 22, 2019

(87) PCT Pub. No.: WO2018/036937
PCT Pub. Date: Mar. 1, 2018

(65) Prior Publication Data
US 2019/0234544 A1    Aug. 1, 2019

(30) Foreign Application Priority Data
Aug. 22, 2016   (DE) .......................... 102016115536.5

(51) Int. Cl.
*F16L 21/06*  (2006.01)
*F16L 19/08*  (2006.01)
*F16L 21/08*  (2006.01)

(52) U.S. Cl.
CPC ........... *F16L 19/083* (2013.01); *F16L 21/065* (2013.01); *F16L 21/08* (2013.01)

(58) Field of Classification Search
CPC ......... F16L 19/083; F16L 19/10; F16L 19/14; F16L 21/08; F16L 21/065
(Continued)

(56) References Cited

U.S. PATENT DOCUMENTS 1,479,317 A    1/1924  Peirce
4,113,289 A    9/1978  Wagner et al.
(Continued)

FOREIGN PATENT DOCUMENTS

CN    1910394 A    2/2007
CN    103620286 A    3/2014
(Continued)

OTHER PUBLICATIONS

First German Office Action for Application No. 10 2016 115 536.5 dated Jul. 21, 2017, 6 pages.
(Continued)

*Primary Examiner* — Aaron M Dunwoody
(74) *Attorney, Agent, or Firm* — Reising Ethington, P.C.

(57) ABSTRACT

A clawed securing means, in particular a pipe coupling, having a band with two halves, which each have a clamping jaw at the ends thereof, the opposing clamping jaws of the two halves being connected to each other in each case by at least one clamping element. The clamping jaws each have at least one lug with a fixed end and a free end. The free end is bent in such a manner that the free end rests on the fixed end of the respective lug and forms a double layer of material. At least one opening is formed in the region of the double layer of material to feed through the at least one clamping element.

11 Claims, 3 Drawing Sheets

(58) Field of Classification Search
USPC .................. 285/337, 340, 373, 419, 420
See application file for complete search history.

(56) References Cited

U.S. PATENT DOCUMENTS

| | | |
|---|---|---|
| 4,819,974 A | 4/1989 | Zeidler |
| 7,475,919 B2 | 1/2009 | Hiernard et al. |
| 9,243,731 B2 | 1/2016 | Breitenbach et al. |

FOREIGN PATENT DOCUMENTS

| | | | | |
|---|---|---|---|---|
| CN | 105518367 A | 4/2016 | | |
| DE | 29711095 U1 | 8/1997 | | |
| DE | 20209784 U1 | 10/2002 | | |
| DE | 102008010871 A1 | 9/2009 | | |
| DE | 102008010871 A1 * | 9/2009 | ............ | F16L 21/065 |
| DE | 102010019864 A1 | 11/2010 | | |
| EP | 0813013 A1 | 12/1997 | | |
| EP | 1245889 A1 | 10/2002 | | |
| EP | 1568930 A1 | 8/2005 | | |
| EP | 2907595 A1 | 8/2015 | | |
| FR | 2602301 B1 | 5/1989 | | |
| FR | 2920495 A1 | 3/2009 | | |
| JP | S5614289 U | 2/1981 | | |
| JP | 2007522420 A | 8/2007 | | |
| KR | 20140013961 A | 2/2014 | | |
| WO | 2005079297 A2 | 9/2005 | | |
| WO | WO2009044024 A2 | 4/2009 | | |

OTHER PUBLICATIONS

International Search Report for Application No. PCT/EP2017/070974 dated Nov. 3, 2017 4 pages.
English Translation of the International Search Report for Application No. PCT/EP2017/070974 dated Nov. 3, 2017, 3 pages.
Korean Office Action for Korean Application No. 10-2019-7008238 dated Nov. 20, 2020 (9 pages).
English Translation of Korean Office Action for Korean Application No. 10-2019-7008238 dated Nov. 20, 2020 (6 pages).
Japanese Office Action for Japanese Application No. 2019-510598 dated Mar. 3, 2020 (8 pages).
English Translation of Japanese Office Action for Japanese Application No. 2019510598 dated Mar. 3, 2020 (16 pages).
Chinese Office Action for Chinese Application No. 201780051526.4 dated Mar. 2, 2020 (8 pages).

* cited by examiner

CLAWED SECURING MEANS

INTRODUCTION

The disclosure relates to a clawed securing device.

Clawed securing devices having radially inwardly directed clawed inserts are used, in particular, for the axial tensile securement of socketless pipes, for instance made of cast iron, which are connected with commercially available connectors according to EN 877. A clawed securing device of this kind is shown, for instance, in EP 1 568 930 B1.

Clawed securing devices often consist of two halves, which on their ends have clamping jaws. The respectively opposing clamping jaws of the two halves are fastened and clamped to one another with the aid of clamping elements. For the stabilization of the clamping elements, in particular screws, additional alignment elements and plates are generally provided for the screw connection. A drawback in this is that the manufacture and assembly is complex and expensive. For instance, on the one hand additional material is required for the elements which reinforce the clamping jaws, on the other hand the respective components have to be produced individually and subsequently welded together.

The clawed inserts of longitudinally non-positive-locking clawed securing devices, which clawed inserts are arranged radially within the half, on the axial rims, must likewise be welded together, whereby the clamps can be used solely for a predetermined nominal width of the pipes, since the claws are fixedly positioned. Moreover, as a result of the welding, the material and shape of the clawed insert are defined once and for all, and specific desires for change, for instance with respect to the choice of material of the clawed insert, cannot be flexibly addressed. In addition, the welding of the clawed insert signifies additional work steps and costs in the manufacture of clawed securing devices of this type. Moreover, increased corrosion can ensue, which reduces the durability of the clawed securing device.

SUMMARY

An object of the disclosure is therefore to remedy the drawbacks of the prior art and to provide a clawed securing device which is easy and inexpensive to produce. In addition, the assembly of the clawed securing device is intended to be simplified.

Moreover, a manufacture of clawed securing devices having clawed inserts, in which a flexible response can be made to different requirements, in particular material requirements, and different nominal widths of the pipes, is intended to be enabled.

In a clawed securing device comprising a band having two halves, which on their ends respectively have a clamping jaw, wherein the opposing clamping jaws of the two halves are respectively connected to one another via at least one clamping element, the disclosure provides in an embodiment that the clamping jaws respectively have at least one bracket having a fixed end and a free end, wherein the free end is bent over such that the free end rests on the fixed end of the respective bracket and forms a material doubling, wherein in the region of the material doubling is formed at least one opening for the feed-through of the at least one clamping element.

The structure according to the disclosure enables that no further elements in the form of stabilization plates and alignment elements have any longer to be provided. These are replaced by the material doubling by bending over of the brackets, whereby those regions of the clamping jaws on which forces act in the clamping and fastening of the clawed securing device are stabilized.

Due to this design in this embodiment, no additional elements are any longer required for the stabilization. Preferably, beads are provided in order to increase the rigidity. The manufacture of the clawed securing device is thus less complex and more cost-effective.

Moreover, the bending over of the bracket enables that material for separate stabilization elements can be saved and that the material of the clawed securing device is used as effectively as possible. This too results in a reduction in manufacturing costs. In addition, a possible corrosion of the metallic components is at least reduced or even precluded. This corrosion can be caused by different, metallic materials of the respective components one to another, for instance clamping jaw to stabilization element.

In addition, the material thickness of the whole of the clawed securing device can be reduced, since, in the heavily loaded regions of the clamping jaws, a material doubling is present. This too reduces the material costs, and thus the manufacturing costs.

In an embodiment it is provided that each clamping jaw has at least two brackets. If the two brackets lie respectively on the axially opposite rim of the clamping jaws, at two points on each clamping jaw a material doubling, and thus also two regions in which can be provided openings which receive the clamping elements, is obtained. Consequently, in this embodiment two clamping elements are provided, whereby a uniform clamping and fastening of the two halves is obtained.

If the brackets lie in the same region of the respective clamping jaw, wherein the respective free ends are configured on axially opposite sides of the clawed securing device, a bending over of the free ends results in an overlapping of the brackets and a multiplication of the material. This stabilizes the loaded regions of the clamping jaws, in particular the openings for the clamping and fastening of the clamping element.

The clamping jaws have a rim which is directed in the direction of the respectively opposing clamping jaw. By this rim, the clamping jaws are stiffened and stabilized. As a result of the shaping and bending over of the brackets, empty spaces, which no longer have any material, are formed within the clamping jaws. The rim counteracts a material weakening due to these free spaces. Moreover, through the provision of a rim in the direction of the opposing clamping jaw, the clamping jaws are prevented from having a sharp outer edge, which would present an injury risk in the assembly of the clawed securing device.

In an embodiment, the free end of the at least one bracket rests on a face of the fixed end of the bracket, wherein the face of the opposing clamping jaw is facing toward a second half. The bracket is thus bent over such that the free end rests on the bottom side of the clamping jaw.

In an embodiment, the bracket is bent over such that the free end of the bracket rests on the fixed end of the bracket on the bottom side of the clamping jaw.

In a refinement, in one of the openings in the region of the material doubling of the clamping jaws is shaped an internal thread. As a result, the clamping element which is received by the opening can be directly fastened. If the clamping element has, in particular, a screw, then this can be screwed to the internal thread in the opening, without the need for further screw connection elements. As a result, the costs can once again be reduced, and the manufacture and assembly simplified.

The opening in the region of the material doubling of the clamping jaws is created by means of flow drilling, whereby there is more material available for the introduction of an internal thread and the thread length can be increased. Moreover, as a result of a higher thread length, an improved clamping of the halves one to another is enabled.

A clamping element is respectively held by two openings in two mutually opposing clamping jaws, whereby the two halves are positioned, clamped and fastened to one another. Where screws are used as the clamping elements, the opening facing away from the screw head is then provided with an internal thread, so that a clamping of the halves can be realized without further elements.

The free end of the at least one bracket of a clamping jaw is bent over more than once, whereby a multiplication of the material is achieved. This additionally strengthens the region of the openings, and thus the region of the clamping elements.

In a refinement, the region of the ends of the halves has one or more beads. Beads are depressions in components, which increase the rigidity of the component. The beads are arranged in a transition region to the clamping jaws. In particular, the beads protrude radially outward. In an embodiment, the respective ends of the halves respectively have two beads.

By virtue of this embodiment, a higher rigidity of the clawed securing device can be achieved without additional material having to be used. In addition, the used material thickness can be chosen smaller compared to an embodiment without beads, whereby the material and manufacturing costs are reduced.

In an embodiment, on axial rims of the halves is in each case arranged a part-circular clawed insert, wherein the clawed insert has a plurality of claws arranged side by side in the peripheral direction and the clawed inserts of the respectively axially opposing rims are inclined toward one another.

The clawed inserts hold the pipe ends to be connected, wherein the oblique alignment of the clawed inserts one to another, and thus to a center axis, has the effect that the clawed inserts secure the pipe ends against axial traction. As a result of the part-circular shape, it is ensured, moreover, that the clawed securing device can be fully opened, since each half has respectively on both axial rims a part-circular clawed insert, which does not reach beyond the half.

The axial rims of the halves are bent radial inward, wherein the clawed inserts, in the region of a bending edge of the rims, bear against an inner side of the halves.

As a result of this construction, the clawed inserts can be easily positioned. The pretensioning of the clawed inserts ensures a stable alignment of the clawed inserts. The clawed inserts are here not welded to the halves, whereby the manufacture is simplified and more cost-effective.

Moreover, clawed inserts which are connected in a non-integrally bonded manner can be flexibly exchanged, whereby different requirements can be addressed without respectively a new production line of another clawed securing device having to be initiated. The clawed securing devices are produced without the clawed insert, and the corresponding clawed inserts can be adapted according to the desired material or size of the pipes to be connected, and used correspondingly. Through the avoidance of a welding of the clawed inserts to the halves, the materials of the two components, moreover, can be flexibly chosen, since not all materials can be welded to one another. In addition, a corrosion between the components made of different metallic materials, or, in particular, an intercrystalline corrosion in the weld region, is prevented.

In an embodiment, the clawed inserts are respectively held in position by one or more holding fingers, wherein, in particular, a holding finger is arranged in the middle or in the respective end region of the respective half. The clawed insert is held in position by two holding fingers, wherein, in particular, respectively one holding finger is arranged in the respective end region of the respective half.

The holding fingers press the clawed insert against the axial rims of the halves, which serve as a boundary and are bent radially inward. Moreover, the ends of the clawed inserts are held positively in the end region of the respective halves. As a result, the welding of the clawed insert to the halves can be dispensed with, whereby the clawed inserts can be exchanged. A flexible choice of material can be important when high requirements are placed on the materials in terms of corrosion resistance or lasting stability.

The holding finger is shaped out of the respective half. Here too, this is constituted by a type of bracket, having a free end which is bent in the direction of the fixed end, and thus in the direction of the nearest axial rim of the respective half. As a result, a type of eyelet, which holds the clawed insert, is formed. This construction enables the holding finger to be shaped directly out of the material of the band and does not subsequently have to be welded on after the manufacture of the clawed securing device. As a result, the manufacture is simplified and becomes more cost-effective.

In a refinement, for each clawed insert at least one stabilization element is provided, wherein the stabilization element stabilizes the claws of a clawed insert in a substantially radially inwardly directed orientation.

These stabilization elements prevent the claws of the clawed insert, for instance, in the course of the assembly, from being pressed flat against the half, whereby the functioning of the tensile securement would be restricted in the axial direction. A faultless assembly of the clawed securing device can thereby be ensured. This stabilization element is shaped, in an embodiment, out of the respective half, wherein a free end of the stabilization element is bent radially inward out of the band of the respective half.

The respective stabilization element has a bead, wherein the material, in particular, is pressed radially inward. This bead reliably stiffens the stabilization element, whereby at this place, too, no weld joint is necessary.

A supporting element, moreover, supports the orientation of the stabilization element radially inward. As a result of this construction, nor does the stabilization element have to be welded to the previously produced clawed securing device, but rather can be shaped out of the existing material of the halves. The manufacture of a clawed securing device of this type is simplified and more cost-effective than with known clawed securing devices.

The halves have recesses, wherein, in particular, at least rims of the recess are bent radially inward in the peripheral direction.

These recesses in the halves can receive closure elements of connectors. The connectors are arranged under the clawed securing device as the sealing component between or in the radial direction of two pipes which are to be connected. The clawed securing device encloses the connector and achieves a tractive securement. By virtue of this embodiment, a leaktight and tensile-force-secured connection can thus be created.

Moreover, the recesses result in a reduction of the required material, which reduces the manufacturing costs and the weight of the clawed securing device.

Moreover, pipe ends can be hooked in place in this region with fastening elements, whereby an additional fastening of the clawed securing device to the pipes can be obtained. Such a hook fastening can be realized, for instance, by a rotary movement of the clawed securing device.

In addition, through the provision of the recesses, an elasticity of the clawed securing device is ensured, which simplifies the assembly of the clawed securing device.

The rims of the recess, which run in the peripheral direction, result, on the one hand, in a stiffening of the region around the recess. On the other hand, the radially inwardly bent rims serve as a lateral boundary for the clawed inserts. In combination with the radially inwardly bent axial rims of the halves, the inward bent rims of the recesses constitute a type of positioning channel. This serves for the alignment of the clawed inserts, without these having to be fixedly welded together.

BRIEF DESCRIPTION OF THE FIGURES

Further features, details and advantages of the disclosure emerge from the text of the claims and from the following description of illustrative embodiments with reference to the drawings, wherein:

DETAILED DESCRIPTION

Figure 1:
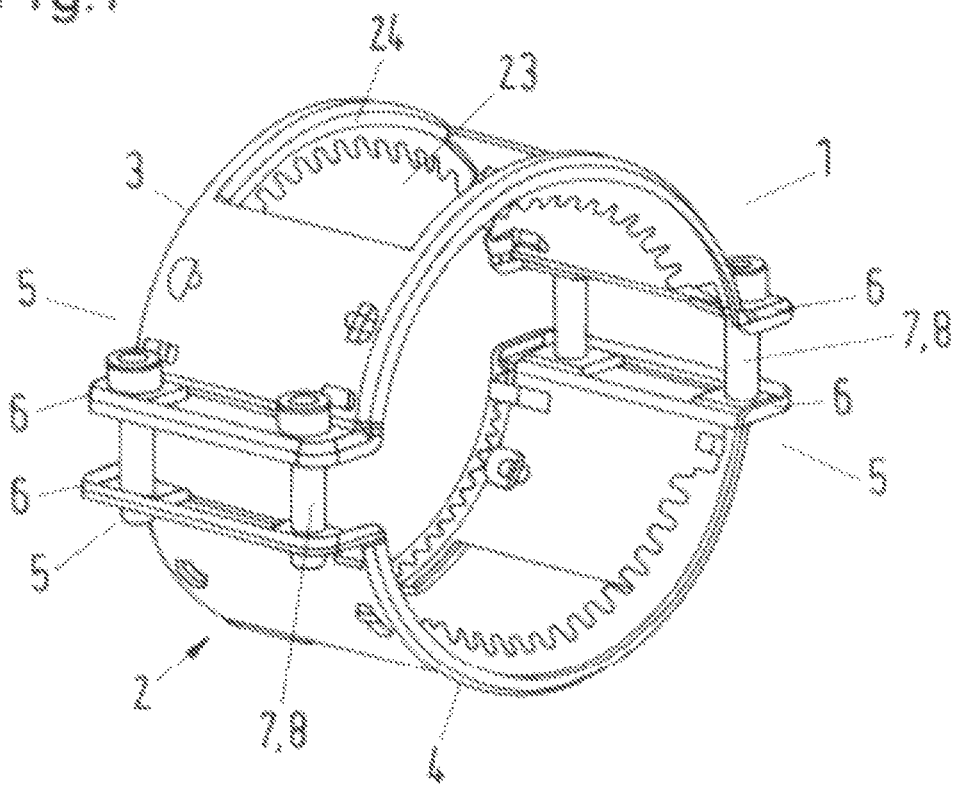
FIG. 1 shows a securing device according to the disclosure.

FIG. 1 shows a clawed securing device 1 according to the disclosure comprising a band 2 having two halves 3, 4. On the ends 5 of the halves 3, 4 are respectively arranged clamping jaws 6, wherein respectively opposing clamping jaws 6 of the two halves 3, 4 are connected via at least one clamping element 7. Clamping elements 7 are here represented in the form of screws 8, wherein, in the embodiment shown in FIG. 1, two clamping elements 7 per clamping jaw pair are provided.

Figure 2:
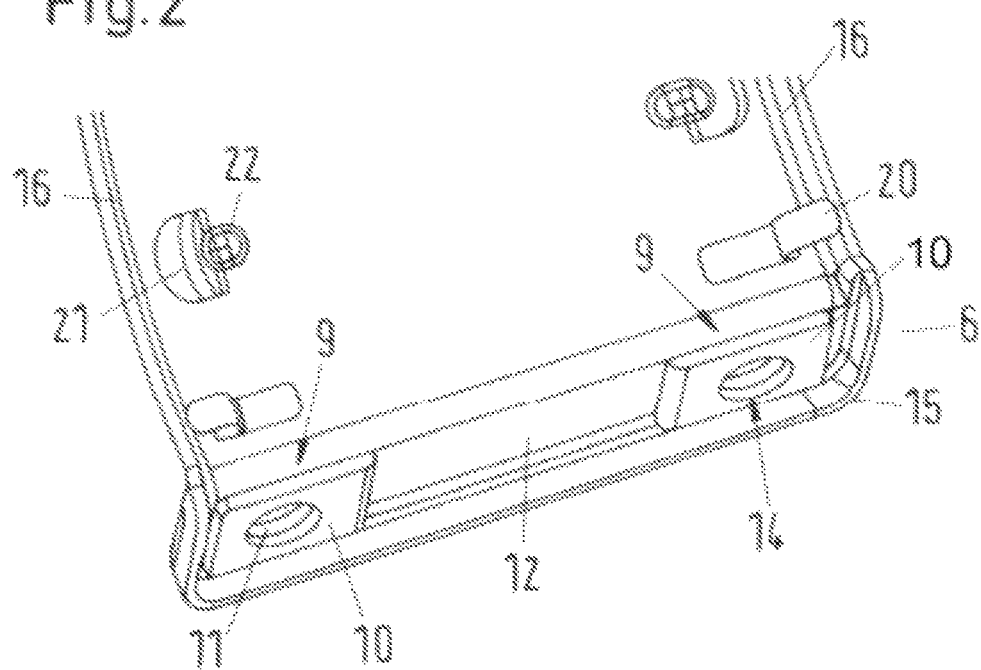
FIG. 2 shows an enlarged view of a clamping jaw 6 of a clawed securing device according to the disclosure.

FIG. 2 shows an enlarged view of a clamping jaw 6. In the represented illustrative embodiment, the clamping jaw 6 has two brackets 9, wherein respectively the free ends 10 are bent over such that the free end 10 rests on the fixed end 11 of the same bracket 9. In particular, the free end 10 of the bracket 9 rests on that face of the fixed end 11 of the bracket 9 which is facing toward the opposing clamping jaw 6. Through the bending over of the free end 10 of the brackets 9, an empty space 12, as well as a material doubling 13, is formed, wherein in the region of the material doubling 13 are provided openings 14 which receive the clamping elements 7.

For stabilization purposes and as grip protection, it is provided that the clamping jaw 6 has a rim 15, which is bent perpendicular to the face of the clamping jaw 6. The rim 15 is here bent in the direction of the opposing clamping jaw 6. Also the axial rims 16 of the halves 3, 4 are bent radially inward.

Figure 3:
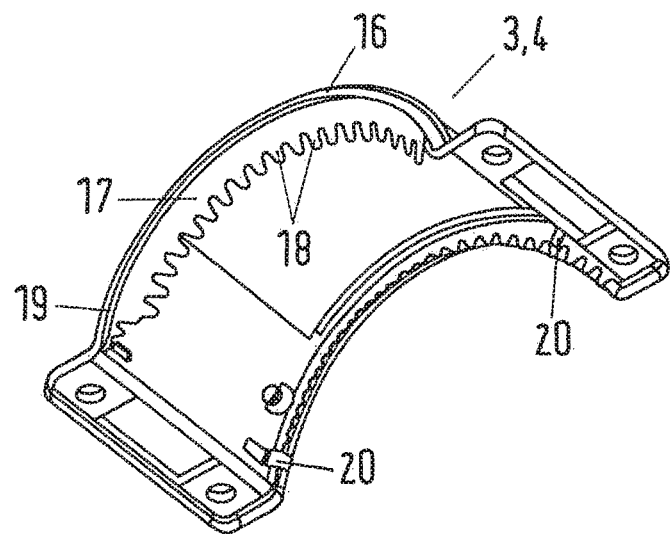
FIG. 3 shows a view of a half 3, 4 with clawed insert 17.

In FIG. 3 is shown a half 3, 4, which on the axial rims 16 of the half 3, 4 in each case has a part-circular clawed insert 17. This clawed insert 17 comprises a plurality of claws 18 arranged side by side in the peripheral direction, which are connected to one another. The clawed inserts 17 arranged respectively on the opposing axial rims 16 are inclined toward one another. As a result of the radially inwardly bent axial rims 16, the clawed insert 17 is in bearing contact in the region of a bending edge 19. In addition, the clawed inserts 17 have a radial pretensioning, whereby they are held in position.

Figure 4:
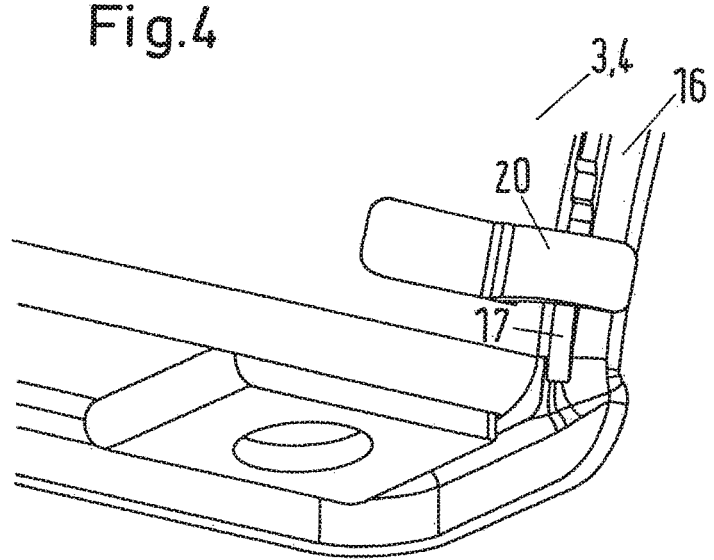
FIG. 4 shows an enlarged view of clamping jaw 6 and half 3, 4 with clawed insert 17.

Holding fingers 20, which are arranged in the respective end region of a half 3, 4, are provided. These holding fingers 20 are shaped out of the respective half 3, 4 and press the clawed insert 17 against the radially inwardly shaped axial rims 16. This is shown in enlarged view in FIG. 4.

Moreover, there is provided at least one stabilization element 21 (FIG. 2), which stabilizes the claws 18 of a clawed insert 17 in a substantially radially inwardly directed orientation. The stabilization element 21 is likewise shaped out of the material of the respective half 3, 4. A supporting element 22 supports the alignment of the stabilization element 21 in an orientation radially inward. The supporting element 22 can consist, for instance, of an oval reinforcement in the material. Such a supporting element 22 is shown, for instance, in FIG. 2.

In an embodiment, the clawed securing device 1 has recesses 23, which, on the one hand, reduce the material quantity required to manufacture the clawed securing device and, on the other hand, serve for the fastening of pipes. It is here provided that the rims 24 of the recess 23 are bent radially inward in the peripheral direction, whereby a positioning channel for the clawed inserts 17 is formed. These features are shown, for instance, in FIG. 1.

Figure 5:
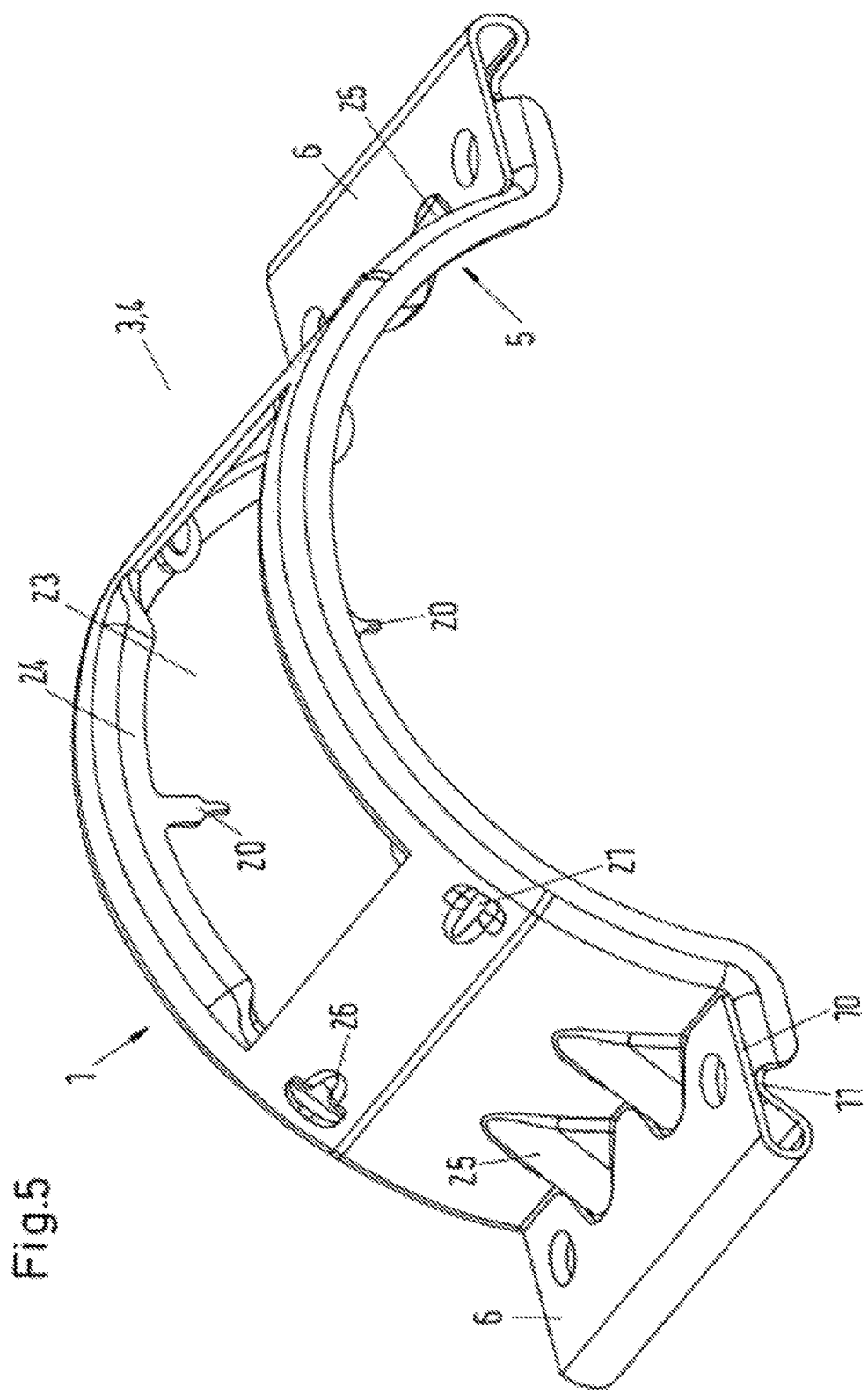
FIG. 5 shows a view of an alternative embodiment of a half 3, 4.

FIG. 5 shows an alternative embodiment of a half 3, 4 of a clawed securing device 1 according to the disclosure. The half 3, 4 has on its ends 5 respectively a clamping jaw 6. These clamping jaws 6 respectively have a bracket 9, which is shaped out of the material of the clamping jaw 6 such that the free end 10 rests on the fixed end 11 of the bracket 9. The bracket 9 extends over the whole of the width of the clamping jaw 6 in the axial direction, so that the substantially entire region of the clamping jaw 6 has a material doubling 13. Two openings 14 are provided in the region of the material doubling 13 for the feed-through respectively of a clamping element 7.

In addition, the clawed securing device 1, in particular the region of the clamping jaws 6, has beads 25, which result in an additional rigidity of the clawed securing device 1. These beads 25 are pressed radially outward out of the material of the clawed securing device 1. In the embodiment shown in FIG. 5, two beads 25 are provided for each clamping jaw 6. Moreover, the free end 9 is shaped such that it recesses the region of the beads 25.

The stabilization elements 21 can also have beads 26, which stiffen the stabilization elements 21. The beads 26 of the stabilization elements 21 are here shaped inward in the radial direction.

Moreover, there is here shown a holding finger 20, which is formed onto the rim 24 of the recess 23 and is arranged substantially in the middle of the half 3, 4 in the peripheral direction. In FIG. 5, no clawed insert is shown. As soon as, in the manufacturing and/or assembly process, a clawed insert 17 is inserted, the holding finger 20 is bent over such that the holding finger 20 holds the clawed insert 17 in position.

The invention is not limited to the previously described embodiments, but can be modified in a number of ways. It is to be understood that the foregoing is a description of one or more preferred exemplary embodiments of the invention. The invention is not limited to the particular embodiment(s)

disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SYMBOL LIST 1 clawed securing device
2 band
3 half
4 half
5 end of the halves 3, 4
6 clamping jaw
7 clamping element
8 screw
9 bracket
10 free end of the bracket 9
11 fixed end of the bracket 9
12 empty space
13 material doubling
14 opening
15 rim of the clamping jaw 6
16 axial rim of the halves 3, 4
17 clawed insert
18 claws
19 bending edge
20 holding finger
21 stabilization element
22 supporting element
23 recess
24 rim of the recess 23
25 beads
26 beads on the stabilization element 21

The invention claimed is:

1. A clawed securing device comprising a band having two halves, which on their ends respectively have a clamping jaw, wherein the clamping jaws of the two halves are respectively connected to one another via at least one clamping element, wherein the clamping jaws respectively have at least one bracket having a fixed end and free end, wherein the free end is bent over such that the free end rests on the fixed end of the respective bracket and forms a material doubling, wherein in a region of the material doubling is formed at least one opening for the feed-through of the at least one clamping element; wherein on axial rims of the halves is in each case arranged a part-circular clawed insert, wherein the clawed insert has a plurality of mutually adjacent claws and the clawed inserts of the respectively axially opposing rims are inclined toward one another, and wherein the clawed inserts are respectively held in position by one or more holding fingers, wherein, in particular, a holding finger is arranged in the middle or in the respective end region of the respective half.

2. The clawed securing device as claimed in claim 1, wherein each clamping jaw has at least two brackets.

3. The clawed securing device as claimed in claim 1, wherein the clamping jaws have a rim, which is directed in the direction of the respectively opposing clamping jaw.

4. The clawed securing device as claimed in claim 1, wherein the free end of the at least one bracket rests on a face of the fixed end of the bracket, wherein the free end of the bracket of the opposing clamping jaw is facing toward the second half.

5. The clawed securing device as claimed in claim 1, wherein at least in one of the openings in the region of the material doubling of the clamping jaws is shaped an internal thread.

6. The clawed securing device as claimed in claim 1, wherein the free end of the at least one bracket of a clamping jaw is bent over more than once and thus achieves a multiplication of the material.

7. The clawed securing device as claimed in claim 1, wherein the axial rims of the halves are bent radially inward, wherein the clawed inserts, in the region of a bending edge of the rims, bear against an inner side of the halves.

8. The clawed securing device as claimed in claim 1, wherein the holding fingers are shaped out of the respective half.

9. The clawed securing device as claimed in claim 1, wherein for each clawed insert at least one stabilization element is provided, wherein the stabilization element stabilizes the claws of a clawed insert in a substantially radial inwardly directed orientation.

10. The clawed securing device as claimed in claim 9, wherein the stabilization element is shaped out of the respective half.

11. The clawed securing device as claimed in claim 1, wherein the halves have recesses, wherein at least rims of the recess are bent radially inward in the peripheral direction.

* * * * *